(12) United States Patent
Jiang et al.

(10) Patent No.: US 9,544,128 B2
(45) Date of Patent: Jan. 10, 2017

(54) METHOD AND APPARATUS FOR DATA AIDED TIMING RECOVERY IN 10GBASE-T SYSTEM

(71) Applicant: QUALCOMM INCORPORATED, San Diego, CA (US)

(72) Inventors: Hai Jiang, Beijing (CN); Yin Huang, Beijing (CN); Changlong Xu, Beijing (CN); Jian Li, Beijing (CN); Yisheng Xue, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/768,302

(22) PCT Filed: Feb. 21, 2013

(86) PCT No.: PCT/CN2013/071735
§ 371 (c)(1),
(2) Date: Aug. 17, 2015

(87) PCT Pub. No.: WO2014/127514
PCT Pub. Date: Aug. 28, 2014

(65) Prior Publication Data
US 2015/0372803 A1 Dec. 24, 2015

(51) Int. Cl.
*H04L 7/00* (2006.01)
*H04L 7/04* (2006.01)
*H04L 7/10* (2006.01)

(52) U.S. Cl.
CPC ........... *H04L 7/0037* (2013.01); *H04L 7/0062* (2013.01); *H04L 7/043* (2013.01); *H04L 7/10* (2013.01)

(58) Field of Classification Search
CPC .. H04B 1/709; H04L 27/2662; H04L 27/2656; H04L 27/2655; H04L 27/2675; H04L 7/0037; H04L 7/0062; H04L 7/043; H04L 7/10; H04J 3/0608; H04J 3/0611; H04J 3/0602; H04J 3/0605
See application file for complete search history.

(56) References Cited

U.S. PATENT DOCUMENTS

| 4,122,393 A | 10/1978 | Gordy et al. |
| 4,599,732 A * | 7/1986 | LeFever ................. H04L 7/043 375/346 |

(Continued)

FOREIGN PATENT DOCUMENTS

| CN | 1175171 A | 3/1998 |
| CN | 101686477 A | 3/2010 |

OTHER PUBLICATIONS

International Search Report and Written Opinion—PCT/CN2013/071735—ISA/EPO—Nov. 28. 2013.

(Continued)

*Primary Examiner* — Sophia Vlahos
(74) *Attorney, Agent, or Firm* — Paradice and Li LLP

(57) ABSTRACT

A method of data-aided timing recovery for Ethernet systems is disclosed. A first device negotiates a pseudorandom number sequence with a second device and receives a data signal from the second device. The first device samples the received data signal to recover a first training sequence. The first device also generates a second training sequence based on the pseudorandom number sequence. The second training sequence is then synchronized with the first training sequence. The synchronized second training sequence is used to align a receive clock signal of the first device with the data signal received from the second device.

26 Claims, 12 Drawing Sheets

(56) References Cited

U.S. PATENT DOCUMENTS

| | | | |
|---|---|---|---|
| 4,621,366 A | | 11/1986 | Cain et al. |
| 5,058,128 A | * | 10/1991 | Kurihara .............. H04B 1/7093 |
| | | | 375/150 |
| 5,574,754 A | * | 11/1996 | Kurihara .............. H04B 1/7075 |
| | | | 375/149 |
| 5,712,873 A | * | 1/1998 | Shiue .................... H04N 5/211 |
| | | | 348/E5.084 |
| 5,835,489 A | * | 11/1998 | Moriya ................ H04B 1/7107 |
| | | | 370/335 |
| 6,693,958 B1 | | 2/2004 | Wang et al. |
| 7,424,067 B2 | * | 9/2008 | Vanderperren ..... H04L 27/2657 |
| | | | 375/326 |
| 7,460,630 B2 | | 12/2008 | Kato et al. |
| 8,045,663 B2 | | 10/2011 | Bae et al. |
| 2003/0107986 A1 | | 6/2003 | Malkemes et al. |
| 2009/0185629 A1 | * | 7/2009 | Gossett .................. H04B 1/707 |
| | | | 375/259 |
| 2010/0304681 A1 | * | 12/2010 | Ghassemzadeh .. H04B 1/71632 |
| | | | 455/63.1 |
| 2012/0099635 A1 | * | 4/2012 | Yoshimochi ........ H04L 25/0212 |
| | | | 375/229 |

OTHER PUBLICATIONS

Supplementary European Search Report—EP13875562—Search Authority—The Hague—Sep. 2, 2016.

* cited by examiner

METHOD AND APPARATUS FOR DATA AIDED TIMING RECOVERY IN 10GBASE-T SYSTEM

TECHNICAL FIELD

The present embodiments relate generally to timing recovery in asynchronous communication systems, and specifically to data-aided timing recovery in high-speed Ethernet systems.

BACKGROUND OF RELATED ART

Timing recovery is an important function of many Ethernet systems. Because data is typically transmitted from one device to another in an asynchronous manner (i.e., without an accompanying clock signal), the receiving (RX) device generates an internal clock signal that is both frequency-aligned and phase-aligned with the received data signal. For example, if data is transmitted by a transmitting (TX) device using a 100 MHz clock signal, the RX device would ideally use a local 100 MHz clock to sample the received data signal. However, the RX device may have to adjust the frequency of the local clock signal to correct for drift in its oscillators and/or transmission paths. Further, the phase of the local clock signal may be adjusted so that it is aligned with the received data signal such that the RX device samples each data symbol at its peak (e.g., to reduce the effects of intersymbol interference).

Higher-frequency data rates correlate with shorter symbol (peak) durations, thus providing a smaller window within which a RX device can accurately sample a received data signal. Intersymbol interference (ISI) is also more pronounced at higher frequencies. Accordingly, as data rates increase, so too does the need for precise and accurate timing recovery circuitry.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A device and method of operation are disclosed that may aid in the recovery of timing information from data signals received from another device. For some embodiments, the device includes a circuit (e.g., receiver or processor) to negotiate a pseudorandom number sequence with another device; an analog-to-digital converter to sample a data signal received from the other device to recover a first training sequence; a training sequence generator to generate a second training sequence based on the pseudorandom number sequence; a data synchronization circuit to synchronize the second training sequence with the first training sequence; and a timing alignment circuit to align a receive clock signal of the device with the received data signal using the synchronized second training sequence.

The data synchronization circuit may include a peak detection circuit to compare the first training sequence with the second training sequence; and a data adjustment circuit to iteratively adjust the second training sequence based on the comparison. The peak detection circuit may include a plurality of comparators to compare each bit of the first training sequence with two or more bits of the second training sequence to generate a plurality of match values; and a peak detect logic to determine a peak correlation between the first and second training sequences based, at least in part, on the plurality of match values. For some embodiments, the peak correlation may be based upon a number of matching bits within the first training sequence and the second training sequence and upon a degree of variation between adjacent bits of the pseudorandom number sequence.

For some embodiments, the data adjustment circuit may include a memory to sequentially output bits of the second training sequence to the peak detection circuit, and include an address counter to increment an address pointer of the memory if no peak correlation is detected after a threshold number of data cycles.

For some embodiments, the timing alignment circuit may include an error detection circuit to determine a timing error between the first training sequence and the synchronized second training sequence, and to output an error signal corresponding to the timing error; and a voltage controlled oscillator to adjust the receive clock signal in response to the error signal.

In operation, the device may negotiate a pseudorandom number sequence with a second device, sample a data signal received from the second device to recover a first training sequence, generate a second training sequence based on the pseudorandom number sequence, synchronize the second training sequence with the first training sequence, and align a receive clock signal of the first device with the received data signal using the synchronized second training sequence.

For some embodiments, the device may synchronize the second training sequence with the first training sequence by comparing the first training sequence with the second training sequence, and then iteratively adjusting the second training sequence based on the comparison. The device may determine a peak correlation between the first and second training sequences, wherein the peak correlation is based upon a number of matching bits within the first training sequence and the second training sequence and upon a degree of variation between adjacent bits of the pseudorandom number sequence. For one example, the device may determine the peak correlation value by comparing each bit of the first training sequence with two or more bits of the second training sequence over a threshold number of data cycles.

BRIEF DESCRIPTION OF THE DRAWINGS

The present embodiments are illustrated by way of example and are not intended to be limited by the figures of the accompanying drawings, where.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components.

Figure 1:
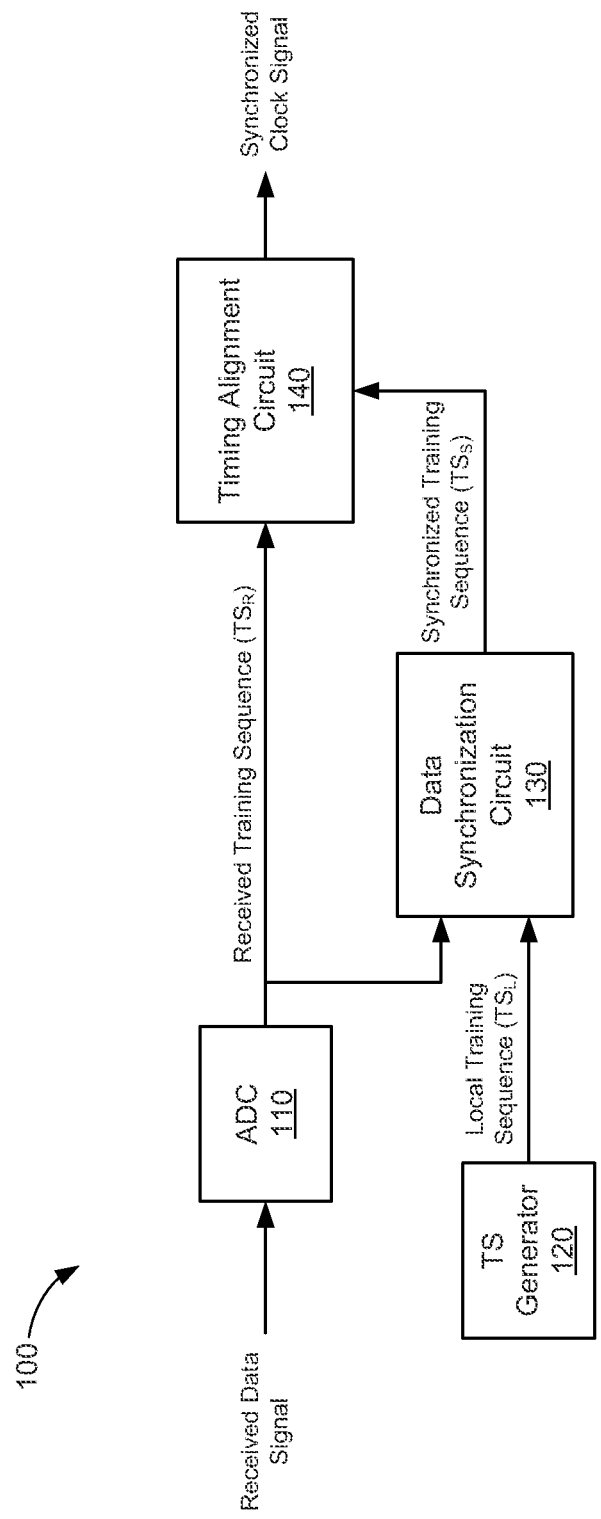
FIG. 1 shows a block diagram of a timing recovery system in accordance with some embodiments.

FIG. 1 shows a block diagram of a timing recovery system 100 in accordance with some embodiments. The timing recovery system 100 may be implemented in a RX device of a data communications network. The timing recovery system 100 includes an analog-to-digital converter (ADC) 110, a training sequence (TS) generator 120, a data synchronization circuit 130, and a timing alignment circuit 140. The ADC 110 includes an input to receive a data signal (e.g., from a TX device), and outputs a received training sequence ($TS_R$) based on samples taken from the received data signal. The TS generator 120 outputs a locally-generated training sequence ($TS_L$). For some embodiments, both the received training sequence $TS_R$ and the local training sequence $TS_L$ are based on the same pseudorandom (PN) number sequence. For example, the RX device may negotiate the PN sequence to be used with the TX device.

The data synchronization circuit 130 receives the received training sequence $TS_R$ and the local training sequence $TS_L$ from the ADC 110 and the TS generator 120, respectively, and in response thereto generates a synchronized training sequence ($TS_S$). For some embodiments, the synchronized training sequence $TS_S$ may be "coarsely" aligned with the received training sequence $TS_R$. For example, the data synchronization circuit 130 may compare the local training sequence $TS_L$ with the received training sequence $TS_R$ to determine whether the timing recovery system 100 is roughly tracking the same bit sequence in both the local training sequence $TS_L$ and the received training sequence $TS_R$. If the bit sequences being read from training sequences $TS_L$ and $TS_R$ are not at least coarsely aligned, it may be very difficult (if not impossible) to align a receive clock of the RX device with the received data signal. Thus, the data synchronization circuit 130 may adjust the local training sequence $TS_L$ so that it tracks the received training sequence $TS_R$.

The timing alignment circuit 140 includes inputs to receive the received training sequence $TS_R$ and the synchronized training sequence $TS_S$ from the ADC 110 and the data synchronization circuit 130, respectively, and outputs a synchronized clock signal. For some embodiments, the synchronized clock signal may be aligned with the received data signal such that samples may be taken at the center (e.g., peak) of each symbol period. For example, the timing alignment circuit 140 may compare the received training sequence $TS_R$ with the synchronized training sequence $TS_S$ to determine a timing error in the samples taken from the received data signal. The timing error may then be used to adjust the timing parameters (e.g., jitter, frequency, and/or phase offset) of the receive clock in the RX device (i.e., the synchronized clock signal).

Figure 2:
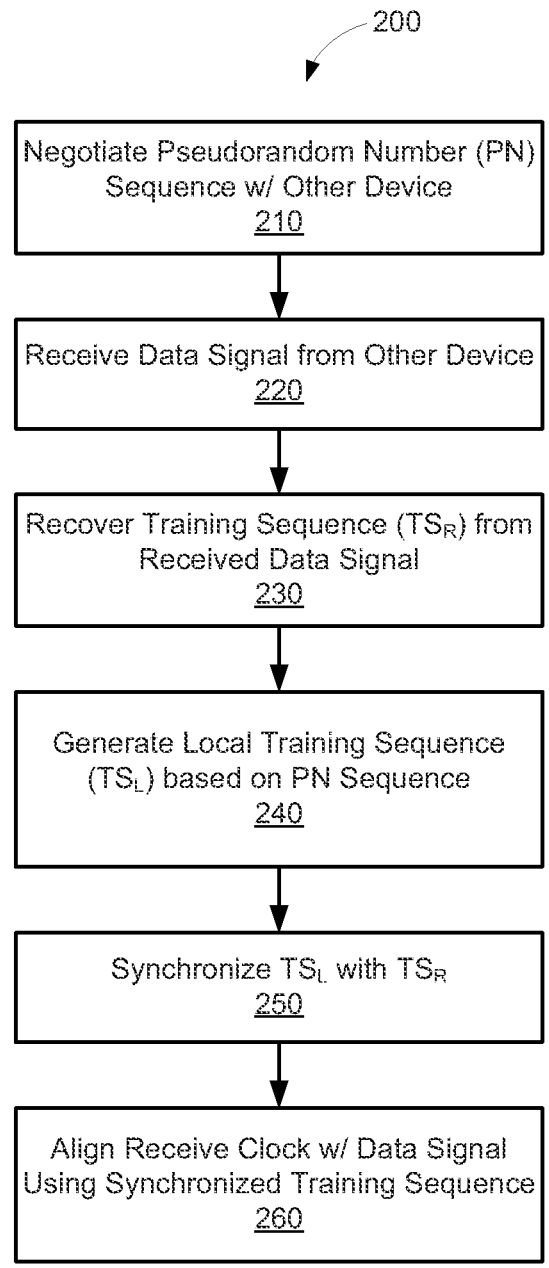
FIG. 2 is an illustrative flow chart depicting an exemplary timing recovery operation in accordance with some embodiments.

FIG. 2 is an illustrative flow chart depicting an exemplary timing recovery operation 200 in accordance with some embodiments. Referring also to FIG. 1, in the operation 200, a RX device first negotiates a PN sequence with a TX device (210). The PN sequence may be used by both the RX and TX devices to generate respective training sequences to be used for purposes of synchronizing the receive clock of the RX device with a received data signal from the TX device. For example, the PN sequence may be generated by a maximum length shift register (within the RX and TX devices), and may be repeatedly output by the shift register (e.g., every 16384 symbols). The initial state of the shift register may be exchanged between the RX device and the TX device during an auto-negotiation procedure, for example, so that the RX device has knowledge of the PN sequence being transmitted by the TX device.

The timing recovery system 100 receives a data signal representing the PN sequence from the TX device (220), and recovers the training sequence $TS_R$ from the received data signal (230). For some embodiments, the PN sequence may be encoded using 2-level pulse-amplitude modulation (2-PAM). Accordingly, the ADC 110 may be used to sample the received data signal in order to recover the training sequence $TS_R$. For example, the ADC 110 may sample the data signal in response to a local receive clock signal (not shown for simplicity) of the RX device. However, due to the nature of asynchronous data transfers, the receive clock signal may not be initially aligned with the received data signal.

The timing recovery system 100 may also generate a local training sequence $TS_L$ based on the same PN sequence used to produce the received training sequence $TS_R$ (240). Specifically, the TS generator 120 may generate the local training sequence $TS_L$ based on information exchanged between the RX and TX devices during the PN sequence negotiation, as described above. For some embodiments, the TS generator 120 may correspond to a shift register with the PN sequence pre-loaded therein. Thus, the TS generator 120 may simply output the local training sequence $TS_L$ based on the initial state of the shift register (in the TX device) used to generate the received training sequence $TS_R$.

Next, the timing recovery system 100 synchronizes the local training sequence $TS_L$ with the received training sequence $TS_R$ (250). As described above, the training sequences $TS_R$ and $TS_L$ may correspond to PN sequences that are repeatedly output by shift registers in the TX and RX devices, respectively. Although the initial state of these shift registers may be the same, the actual bit sequences of $TS_R$ and $TS_L$, as perceived by the timing recovery system 100, may differ. Specifically, a number of factors (e.g., jitter, delay, interference, etc.) may alter or otherwise affect the data signal received from the TX device. For example, interference along the transmission medium (e.g., between the TX device and the RX device) may alter the data signal such that one or more bits of the received training sequence $TS_R$ are unrecoverable. Accordingly, it may be very difficult to time the output of the TS generator 120 with the output of the ADC 110 such that the bit sequence of $TS_L$ is initially aligned with the bit sequence of $TS_R$.

For some embodiments, the data synchronization circuit 130 compares the local training sequence $TS_L$ to the received training sequence $TS_R$, and adjusts $TS_L$ based on any discovered discrepancies. Once the local training sequence $TS_L$ is synchronized with the received training sequence $TS_R$, the data synchronization circuit 130 may output $TS_L$ as the synchronized training sequence $TS_S$. For some embodiments, the data synchronization circuit 130 iteratively adjusts the local training sequence $TS_L$ until the bit sequence of $TS_L$ tracks the bit sequence of $TS_R$. For example, due to interference along the transmission path, a first set of bits of the received training sequence $TS_R$ may or may not match a first set of bits of the local training sequence $TS_L$. However, because the local training sequence $TS_L$ is generated internally, it can be adjusted to match the received training sequence $TS_R$. Thus, if the received training sequence $TS_R$ is out of sync with the local training sequence $TS_L$, the data synchronization circuit 130 may "step-up" the bit sequence of $TS_L$ until it matches a corresponding bit sequence of $TS_R$.

After the local training sequence $TS_L$ is synchronized with the received training sequence $TS_R$, the timing recovery system 100 uses the synchronized training sequence (e.g., $TS_S$) to align the local receive clock with the received data signal (260). For example, because $TS_S$ is synchronized with $TS_R$, the individual bit values of $TS_S$ can be used as "ideal" reference values for identifying the symbol peaks of corresponding bits in $TS_R$. For some embodiments, the timing alignment circuit 140 may compare the synchronized training sequence $TS_S$ with the received training sequence $TS_R$ to determine a timing error that can then be used to correct the phase and/or frequency of the local receive clock signal.

Figure 3:
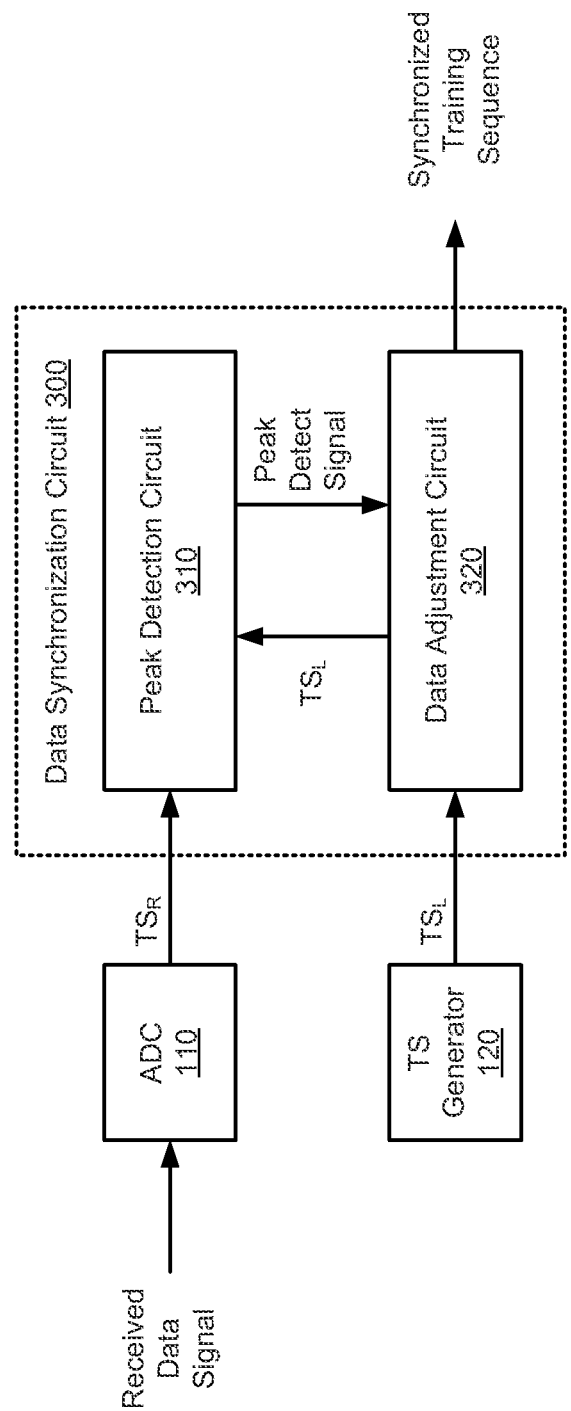
FIG. 3 shows a block diagram of a data synchronization circuit in accordance with some embodiments.

FIG. 3 shows a block diagram of a data synchronization circuit 300 that is one embodiment of the data synchronization circuit 130 of FIG. 1. The data synchronization circuit 300 includes a peak detection circuit 310 and a data adjustment circuit 320, and is shown in FIG. 3 as being coupled to ADC 110 and TS generator 120. As described above, the ADC 110 samples a received data signal to recover the received training sequence $TS_R$, and outputs the received training sequence $TS_R$ to the peak detection circuit 310. The TS generator 120 outputs the local training sequence $TS_L$ to the data adjustment circuit 320. For some embodiments, the data adjustment circuit 320 may sequentially output individual bits of the local training sequence $TS_L$ in rhythm with the received training sequence $TS_R$ output by the ADC 110.

The peak detection circuit 310 includes inputs to receive the local training sequence $TS_L$ and the received training sequence $TS_R$ from the data adjustment circuit 320 and the ADC 110, respectively, and outputs a peak detect signal. For some embodiments, the peak detection circuit 310 may compare the local training sequence $TS_L$ with the received training sequence $TS_R$ to detect a "peak correlation" between the two training sequences $TS_L$ and $TS_R$. A peak correlation may be detected when (i) a variance between the bit values of a portion of the received training sequence $TS_R$ (and/or the local training sequence $TS_L$) meets or exceeds a bit variance threshold value and (ii) a number of matches between corresponding bits of the local training sequence $TS_L$ and the received training sequence $TS_R$ meets or exceeds a bit match thresholdvalue, as described in more detail below with respect to FIG. 5. Specifically, the peak detection circuit 310 may assert the peak detect signal upon detecting a peak correlation between the received training sequence $TS_R$ and the local training sequence $TS_L$.

The data adjustment circuit 320 may adjust the local training sequence $TS_L$ in response to the peak detect signal. For some embodiments, if the peak detect signal remains de-asserted after a threshold number of data cycles (or clock cycles) have elapsed, the data adjustment circuit 320 may adjust the local training sequence $TS_L$ by "skipping over" one or more bits in the sequence. Specifically, the data adjustment circuit 320 may adjust the local training sequence $TS_L$ by incrementing the portion of the negotiated PN sequence that the local training sequence $TS_L$ is currently tracking. When the local training sequence $TS_L$ is synchronized with the received training sequence $TS_R$, the peak detection circuit 310 asserts the peak detect signal and, in response thereto, the data adjustment circuit 320 outputs the synchronized training sequence $TS_S$.

The synchronized training sequence $TS_S$ may be subsequently used to align a receive clock signal with the received data signal. For example, because the synchronized training sequence $TS_S$ is synchronized (e.g., coarsely aligned) with the received training sequence $TS_R$, the sequence of bits output by the data adjustment circuit 320 may coincide with (e.g., match) the sequence of bits output by the ADC 110. Thus, timing alignment may be performed by comparing the synchronized training sequence $TS_S$ with the received training sequence $TS_R$.

Figure 4:
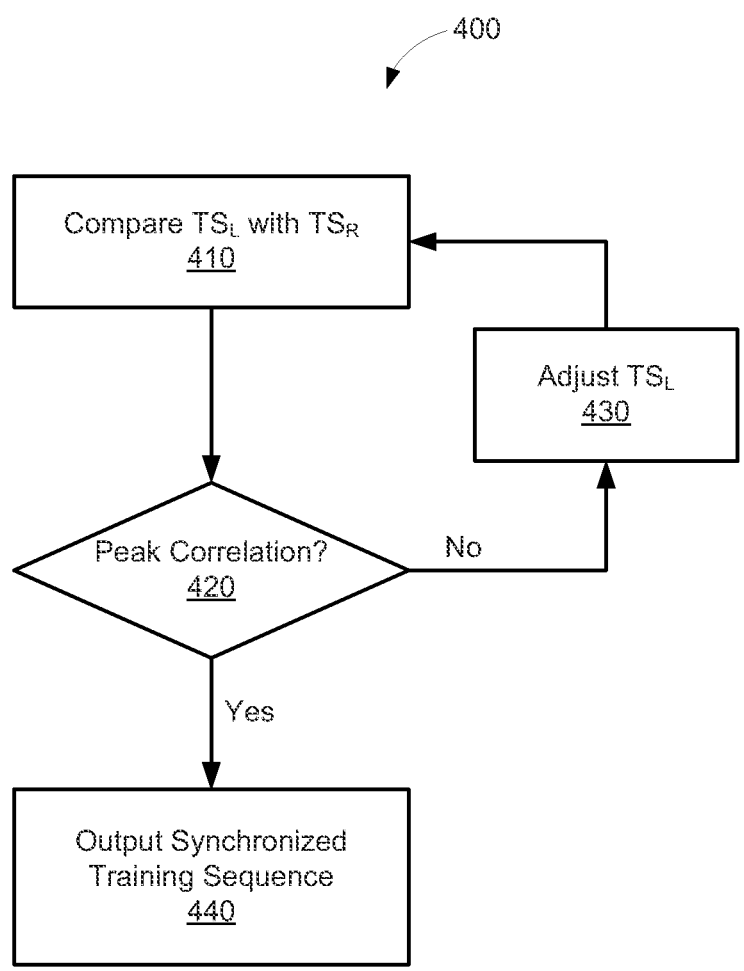
FIG. 4 is an illustrative flow chart depicting an exemplary data synchronization operation in accordance with some embodiments.

FIG. 4 is an illustrative flow chart depicting an exemplary data synchronization operation 400 in accordance with some embodiments. As described above, the present embodiments enable a RX device to coarsely align a local training sequence $TS_L$ with a received training sequence $TS_R$ from a TX device. Referring also to FIG. 3, in the operation 400, the data synchronization circuit 300 first compares the local training sequence $TS_L$ with the received training sequence $TS_R$ (410). Specifically, the peak detection circuit 310 may perform a bit-by-bit comparison of the received training sequence $TS_R$ (as received from the ADC 110) with the local training sequence $TS_L$ (as received from the data adjustment circuit 320). For some embodiments, the peak detection circuit 310 may compare each bit of the local training sequence $TS_L$ with two or more bits of the received training sequence $TS_R$.

The data synchronization circuit 300 then determines whether there is a peak correlation between the local training sequence $TS_L$ and the received training sequence $TS_R$ (420). As mentioned above, a peak correlation may be detected when (i) a variance between the bit values of a portion of the received training sequence $TS_R$ (and/or the local training sequence $TS_L$) meets or exceeds a bit variance threshold value and (ii) a number of matches between corresponding bits of the local training sequence $TS_L$ and the received training sequence $TS_R$ meets or exceeds a bit match thresholdvalue. For some embodiments, the peak detection circuit 310 may gather comparison data between $TS_L$ and $TS_R$ (410) for a threshold number of data cycles before making a peak correlation determination (420).

Figure 5:
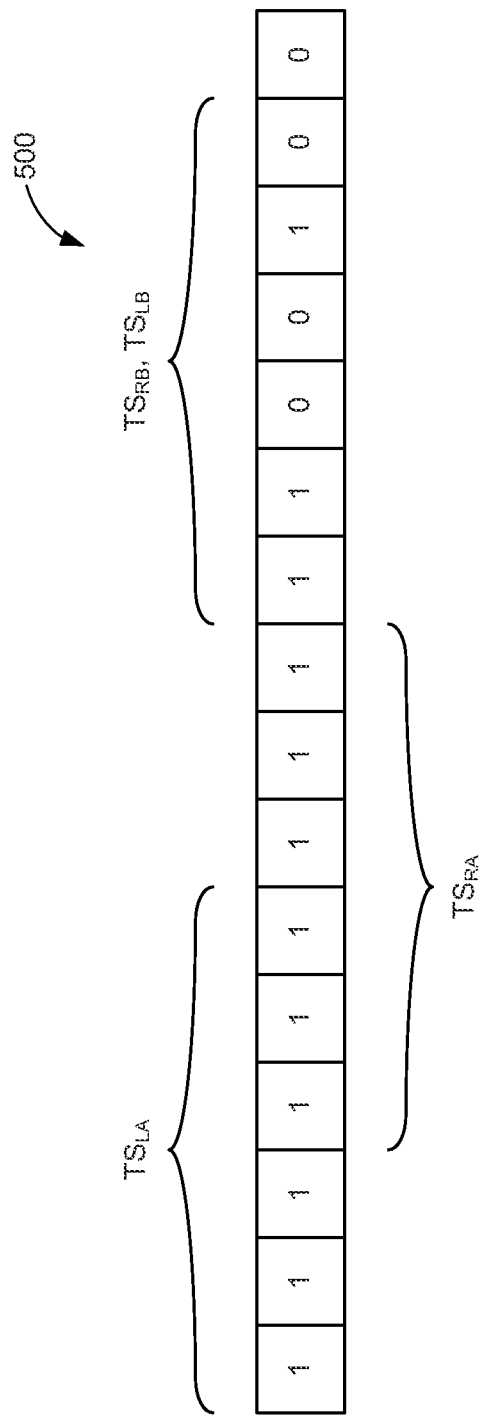
FIG. 5 shows an exemplary pseudorandom number sequence in accordance with some embodiments.

For example, FIG. 5 shows an exemplary PN sequence 500 corresponding to a received training sequence $TS_R$ and a local training sequence $TS_L$. The received training sequence $TS_R$ includes a first 6-bit portion $TS_{RA}$ and a second 6-bit portion $TS_{RB}$, and the local training sequence $TS_L$ includes a first 6-bit portion $TS_{LA}$ and a second 6-bit portion $TS_{LB}$. For the exemplary PN sequence 500, a peak determination operation may be performed for each 6-bit portion of the received training sequence $TS_R$ and the local training sequence $TS_L$. More specifically, if the bit sequence "111111" corresponding to the first received training sequence portion $TS_{RA}$ is compared with the bit sequence "111111" corresponding to the first local training sequence portion $TS_{LA}$, all six bit-comparisons result in matches. However, a peak correlation may not be indicated because there is no variance between the bit values of the overlapping sequences "111111" (and therefore it may be difficult to determine whether the training sequences $TS_R$ and $TS_L$ are aligned with the same portion of the PN sequence 500 or coincidentally all "1's").

Conversely, the bit sequence "110010" corresponding to the second received training sequence portion $TS_{RB}$ and the second local training sequence portion $TS_{LB}$ may result in an indication of a peak correlation because the variance between the bit values of the sequence "110010" is equal to three (e.g., there are 3 state changes in the binary values of the sequence "110010"). Thus, if the variance threshold value is three or less for this example, then the comparison between $TS_{RB}$ and $TS_{LB}$ results in an indication of a peak correlation. Thus, in accordance with the present embodiments, greater variations between the bit values of the training sequenceportions may indicate a stronger likelihood that matches between the received training sequence $TS_R$ and the local training sequence $TS_L$ results from synchronization between $TS_R$ and $TS_L$, while lesser variations between the bit values of the training sequence portions may indicate a stronger likelihood that matches between the received training sequence $TS_R$ and the local training sequence $TS_L$ are coincidental.

Referring again to FIG. 4, if no peak correlation is detected, as tested at 420, the data synchronization circuit 300 may adjust the local training sequence $TS_L$ (430) and compare the adjusted local training sequence $TS_L$ with the received training sequence $TS_R$ (410). Specifically, the data adjustment circuit 320 may adjust the local training sequence $TS_L$ by incrementing the portion of the negotiated PN sequence that the local training sequence $TS_L$ is currently tracking. For example, referring again to FIG. 5, the initial bit sequence of portion $TS_{LA}$ is ahead of the corresponding bit sequence of first received training sequence portion $TS_{RA}$ by three data cycles (e.g., relative to the PN sequence 500). Thus, in order to synchronize the local training sequence $TS_L$ with the received training sequence $TS_R$, the data adjustment circuit 320 may skip over the next three bits in the second local training sequence portion $TS_B$. For some embodiments, the step of adjusting the local training sequence $TS_L$ (430) may be performed iteratively, wherein the data adjustment circuit 320 increments $TS_L$ by one data cycle for each iteration (e.g., each time a peak correlation determination is made).

Once a peak correlation is found, as tested at 420, the data synchronization circuit 300 outputs the synchronized training sequence $TS_S$ (440). Specifically, the data adjustment circuit 320 may output the synchronized training sequence $TS_S$ to the timing alignment circuit 140 (see also FIG. 1), where it may then be used to precisely align a receive clock signal of the RX device with the data signal received from the TX device. For some embodiments, the data adjustment circuit 320 may output the adjusted local training sequence $TS_L$ as the synchronized training sequence $TS_S$.

Figure 6:
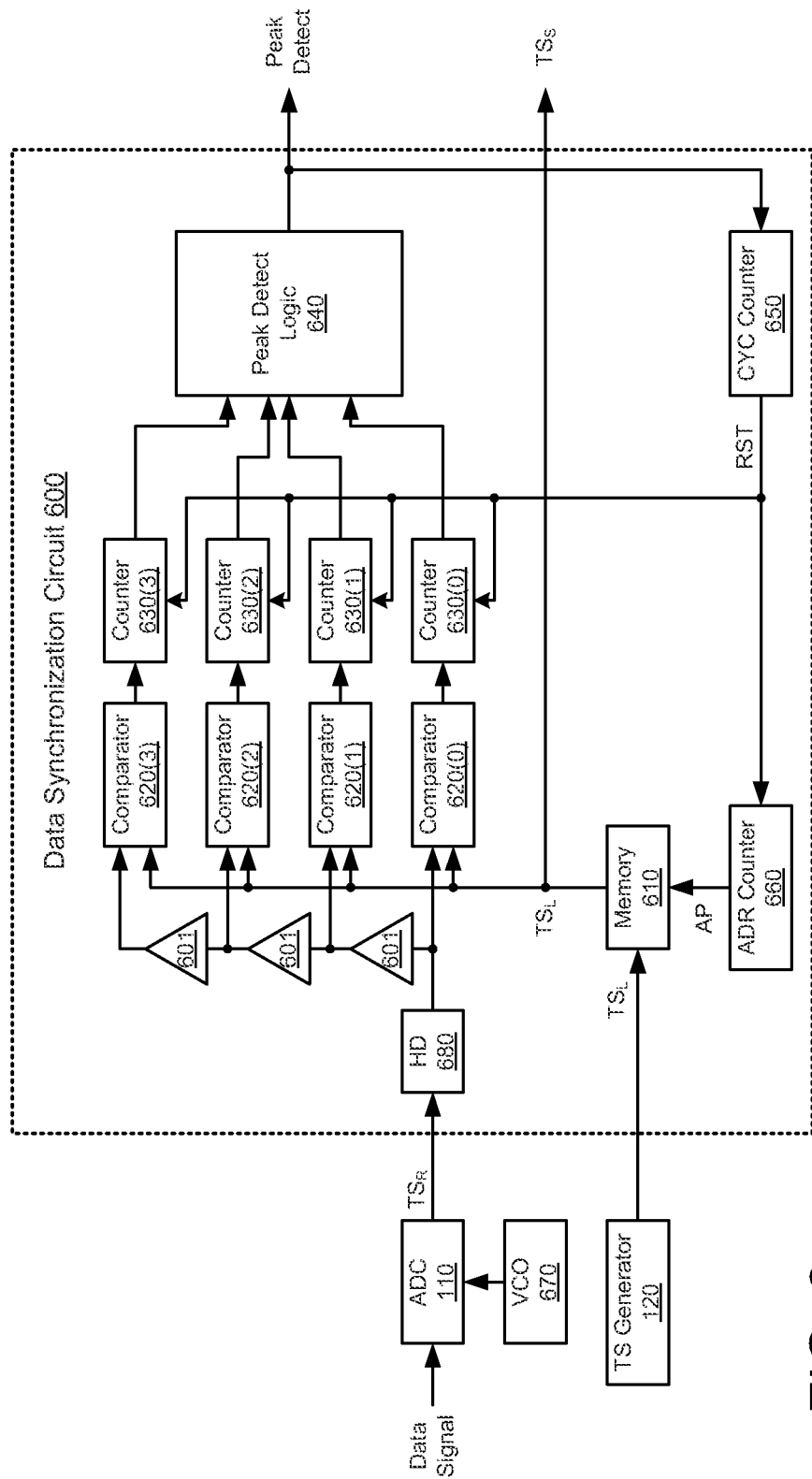
FIG. 6 shows a block diagram of a data synchronization circuit in accordance with other embodiments.

FIG. 6 shows a data synchronization circuit 600 that is another embodiment of the data synchronization circuit 130 of FIG. 1. The data synchronization circuit 600 includes a memory 610, a set of comparators 620(0)-620(3) coupled to a corresponding set of counters 630(0)-630(3), a peak detect logic 640, a data cycle (CYC) counter 650, and an address (ADR) counter 660, and is shown in FIG. 6 as being coupled to ADC 110 and TS generator 120. The ADC 110 samples the received data signal, and outputs the training sequence $TS_R$ based on the sampling. For some embodiments, a voltage-controlled oscillator (VCO) 670 may provide a clock signal used by the ADC 110 to sample the received data signal. For some embodiments, a hard-decision (HD) logic 680 may convert each data sample of the received training sequence $TS_R$ to a binary value (e.g., either a logic "1" or "0").

The TS generator 120 outputs the local training sequence $TS_L$ to be stored in the memory 610. For some embodiments, the memory 610 may correspond to a random access memory (RAM) device. The memory 610 is configured to output one bit of the local training sequence $TS_L$ based on an address pointer (AP) provided by the ADR counter 660. For example, the ADR counter 660 may be configured to increment the value of the address pointer AP upon every data cycle of a data synchronization operation. Thus, the memory 610 may output a different bit of the local training sequence $TS_L$ for every data cycle.

Each of the comparators 620(0)-620(3) includes a first input to receive a bit of the local training sequence $TS_L$ (output from the memory 610), and a second input to receive a bit of the received training sequence $TS_R$ (output by the ADC 110). A delay element 601 is coupled to an input path of each of the comparators 620(1)-620(3) such that each of the comparators 620(0)-620(3) receives a different bit of the received training sequence $TS_R$ at any given time. Specifically, comparator 620(0) receives the current bit of the received training sequence $TS_R$, comparator 620(1) receives the previous $TS_R$ bit (e.g., the bit output by the ADC 110 during the previous data cycle), comparator 620(2) receives the $TS_R$ bit from two previous data cycles, and comparator 620(3) receives the $TS_R$ bit from three previous data cycles.

During each data cycle, the comparators 620(0)-620(3) compare their respective $TS_R$ bits to the $TS_L$ bit output from the memory 610, and output the match results to the set of counters 630(0)-630(3). For example, if a match is detected in any of the comparators 620(0)-620(3), then a corresponding counter 630(0)-630(3) records the match (and increments a corresponding match count value). The stored match count values are provided as inputs to the peak detect logic 640, which determines, based on the received match count values, whether a peak correlation between the training sequences $TS_L$ and $TS_R$ has been found. As described above, the peak detect logic 640 may detect a peak correlation when (i) a variance between the bit values of a portion of the received training sequence $TS_R$ (and/or the local training sequence $TS_L$) meets or exceeds a bit variance threshold value and (ii) a number of matches between corresponding bits of the local training sequence $TS_L$ and the received training sequence $TS_R$ meets or exceeds a bit match thresholdvalue. Upon detecting a peak correlation between the training sequences $TS_R$ and $TS_L$, the peak detect logic 640 may assert the peak detect signal.

The CYC counter 650 maintains a count of the number of data cycles completed by a data synchronization operation. Specifically, the CYC counter 650 may update a stored count value each time a data cycle is completed. When the count value reaches a threshold number (L), and the peak detect signal is not asserted, the CYC counter 650 outputs a reset (RST) signal to the ADR counter 660 and the set of counters 630(0)-630(3). The RST signal resets the count values stored in each of the counters 630(0)-630(3), and causes the ADR counter 660 to increment the value of the address pointer AP for the memory 610. For example, if the ADR counter 660 is configured to automatically increment the address pointer AP on every data cycle, assertion of the RST signal may cause the ADR counter 660 to increment the address pointer AP twice, thus causing the memory 610 to skip a bit of the local training sequence $TS_L$.

For some embodiments, assertion of the peak detect signal may prevent the CYC counter 650 from asserting the RST signal, thus preventing any further adjustments from being made to the local training sequence $TS_L$. Furthermore, assertion of the peak detect signal may also cause the current state of the local training sequence $TS_L$ (e.g., as pointed to by the address pointer AP) to be output from the data synchronization circuit 600 as the synchronized training sequence $TS_S$. For some embodiments, the peak detect signal may be output along with the synchronized training sequence $TS_S$ to trigger a timing alignment operation (e.g., by timing alignment circuit 140 of FIG. 1). For other embodiments, the synchronized training sequence $TS_S$ may be gated by the peak detect signal at the output of the data synchronization circuit 600, for example, to prevent the data synchronization circuit 600 from outputting the local training sequence $TS_L$ (e.g., as the synchronized training sequence $TS_S$) unless the peak detect signal is asserted.

Figure 7A:
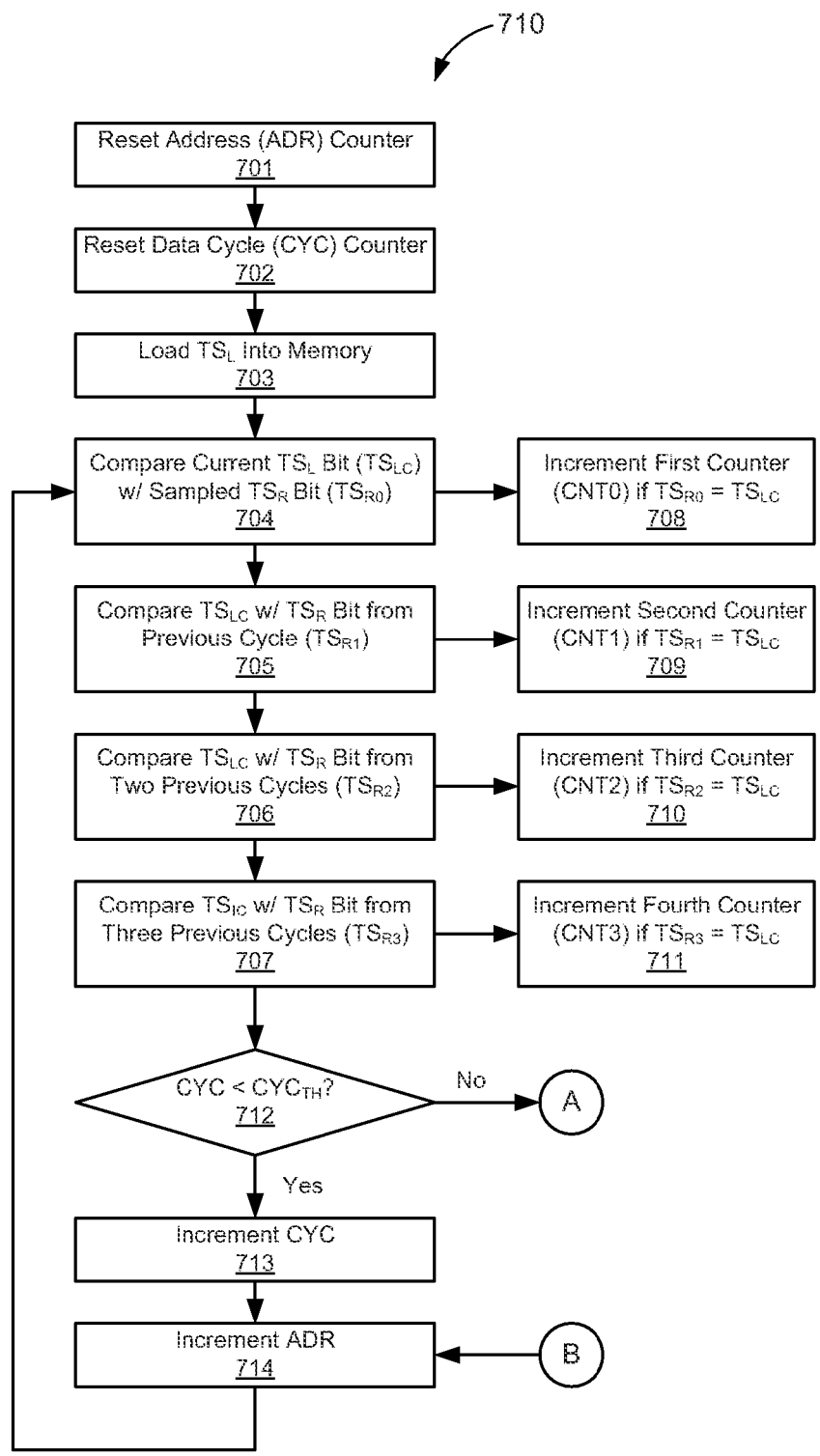
FIGS. 7A-7B are illustrative flow charts depicting another exemplary data synchronization operation in accordance with some embodiments.
Figure 7B:
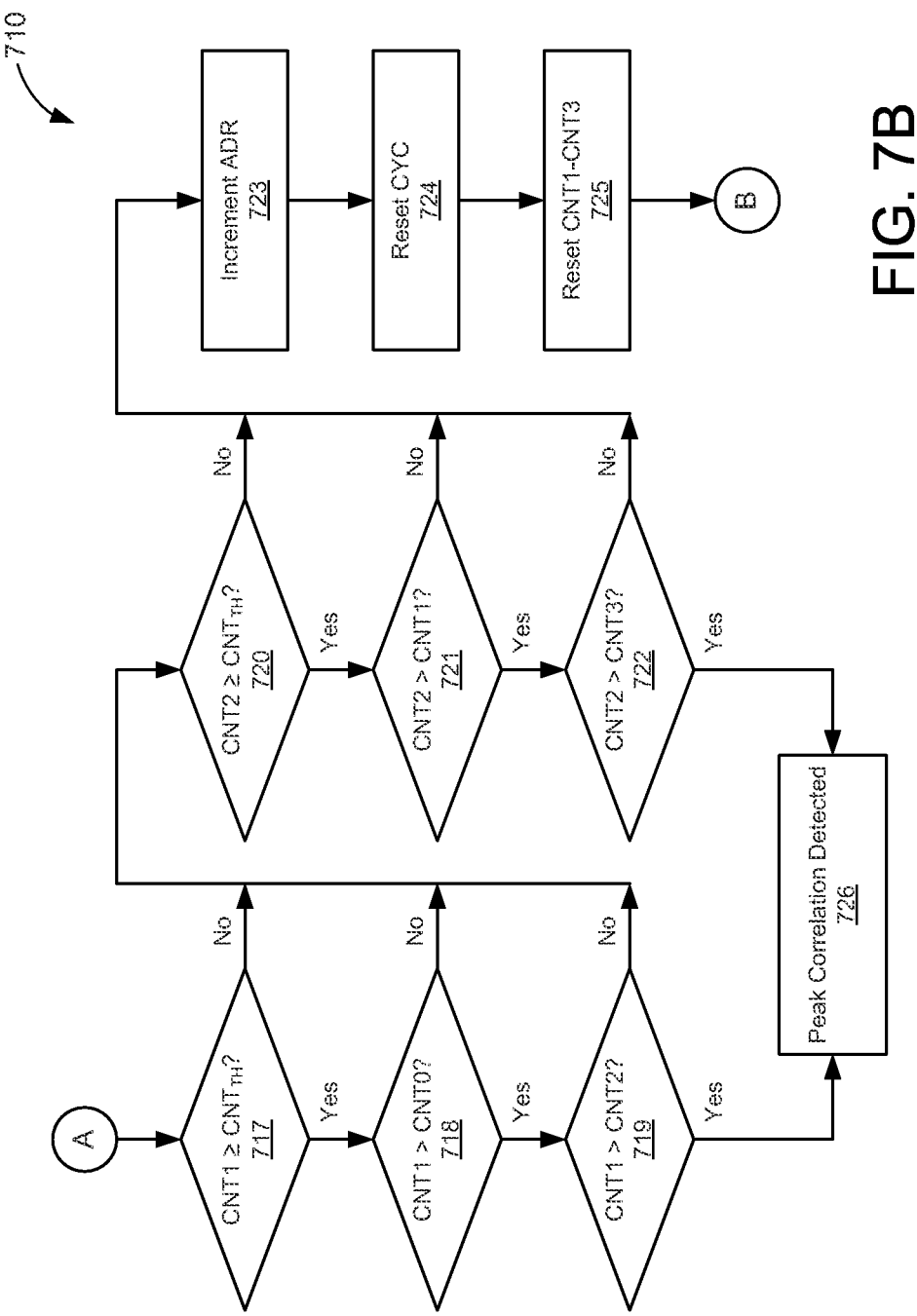

FIGS. 7A-7B are illustrative flow charts depicting another exemplary data synchronization operation 710 in accordance with some embodiments. Referring also to FIG. 6, the operation 710 begins by resetting both an address counter (701) and a data cycle counter (702). For example, resetting the ADR counter 660 may cause the address pointer AP to point to the address of the first bit of data stored in the memory 610. Resetting the CYC counter 650 may cause the count value of the CYC counter 650 to be initialized to zero. The data synchronization circuit 600 may also load a local training sequence $TS_L$ into memory (703). For example, the local training sequence $TS_L$ output by the TS generator 120 may be stored in the memory 610.

Next, the current bit ($TS_{LC}$) of the local training sequence $TS_L$ is compared with a sampled bit ($TS_{R0}$) of the received training sequence $TS_R$(704), and a first counter (ONTO) is incremented if the bits match (708). For example, the comparator 620(0) may compare the $TS_{R0}$ bit that is currently sampled by the ADC 110 with the $TS_{LC}$ bit read out of the memory 610. The counter 630(0) may store the result of the comparison by updating the count value of ONTO.

Then, depending on how many data cycles have been completed, the $TS_{LC}$ bit may also be compared with previously sampled bits ($TS_{R1}$-$TS_{R3}$) from up to three prior data cycles (705-707), and respective counters (CNT1-CNT3) may be incremented to record any matches (709-711). For example, the comparator 620(1) may compare the $TS_{R1}$ bit from the previous data cycle with the $TS_{LC}$ bit read out of memory 610, the comparator 620(2) may compare the $TS_{R2}$ bit from two previous data cycles with the $TS_{LC}$ bit, and the comparator 620(3) may compare the $TS_{R3}$ bit from three previous data cycles with the $TS_{LC}$ bit. Each the counters 630(1)-630(3) may store the result of a corresponding comparison by updating the count values for CNT1-CNT3, respectively.

The data synchronization circuit 600 then determines whether a threshold number of data cycles ($CYC_{TH}$) have been completed (712). As long as the CYC counter 650 has not yet reached the threshold $CYC_{TH}$, the data synchronization circuit 600 continues to increment both the CYC counter 650 (713) and the ADR counter 660 (714), while reading and comparing subsequent bits of the local training sequence $TS_L$ and the received training sequence $TS_R$ (704-707). For example, the CYC counter 650 may increment its stored count value to reflect the completion of a data cycle. The ADR counter 660 may increment the bit address associated with the address pointer AP, which in turn causes the next $TS_L$ bit to be read from the memory 610.

Once the threshold number of data cycles $CYC_{TH}$ has been reached, as tested at 712, the data synchronization circuit 600 may proceed to perform a peak correlation determination, as depicted in FIG. 7B. Specifically, a determination is made as to whether the second counter CNT1 has recorded a threshold number ($CNT_{TH}$) of matches (717), whether the second counter CNT1 has recorded more matches than the first counter ONTO (718), and whether the second counter CNT1 has recorded more matches than the third counter CNT2 (719). If all of these conditions (717-719) are satisfied, then the data synchronization circuit 600 may indicate that a peak correlation has been detected (726). Otherwise, a determination is made as to whether the third counter CNT2 has recorded at least $CNT_{TH}$ matches (720), whether the third counter CNT2 has recorded more matches than the second counter CNT1 (721), and whether the third counter CNT2 has recorded more matches than the fourth counter CNT3 (722). Again, if all of these conditions (720-722) are satisfied, then the data synchronization circuit 600 may indicate that peak correlation has been detected (726).

For example, referring also to FIG. 6, the peak detect logic 640 may analyze the outputs from each of the counters 630(1)-630(3) (e.g., CNT1-CNT3) to determine whether the above conditions (717-722) are satisfied. If the peak detect logic 640 determines that either of the first set of conditions (717-719) or the second set of conditions (720-722) have been satisfied, then the peak detect logic 640 may assert the peak detect signal to indicate that a peak correlation has been detected (726). Upon receiving the peak detect signal, the CYC counter 650 is prevented from asserting the RST signal. Further, upon assertion of the peak detect signal, the current state of the local training sequence $TS_L$ may be output as the synchronized training sequence $TS_S$. Note that when a peak correlation is detected by the peak detect logic 640, the current $TS_L$ bit ($TS_{LC}$) may be in sync with the $TS_R$ bit from one or two previous data cycles ($TS_{R1}$ or $TS_{R2}$). Thus, for some embodiments, the ADR counter 660 may further increment the bit address associated with the address pointer AP (e.g., by one or two bits) when a peak correlation is detected to enable the local training sequence $TS_L$ to "catch up" to the received training sequence $TS_R$.

However, if any of the conditions 717-722 are not satisfied, the data synchronization circuit 600 may proceed to increment the ADR counter 660 (723), reset the CYC counter 650 (724), and reset each of the individual counters CNT0-CNT3 (725). For example, if the peak detect signal has not been asserted after the threshold number of data cycles $CYC_{TH}$ has been reached, the CYC counter 650 may reset its stored count value and output a RST signal to reset the counters 630(0)-630(3) and to instruct the ADR counter 660 to increment the bit address associated with the address pointer AP. This may set up the peak detect logic 640 for a subsequent peak correlation operation (717-726).

Figure 8:
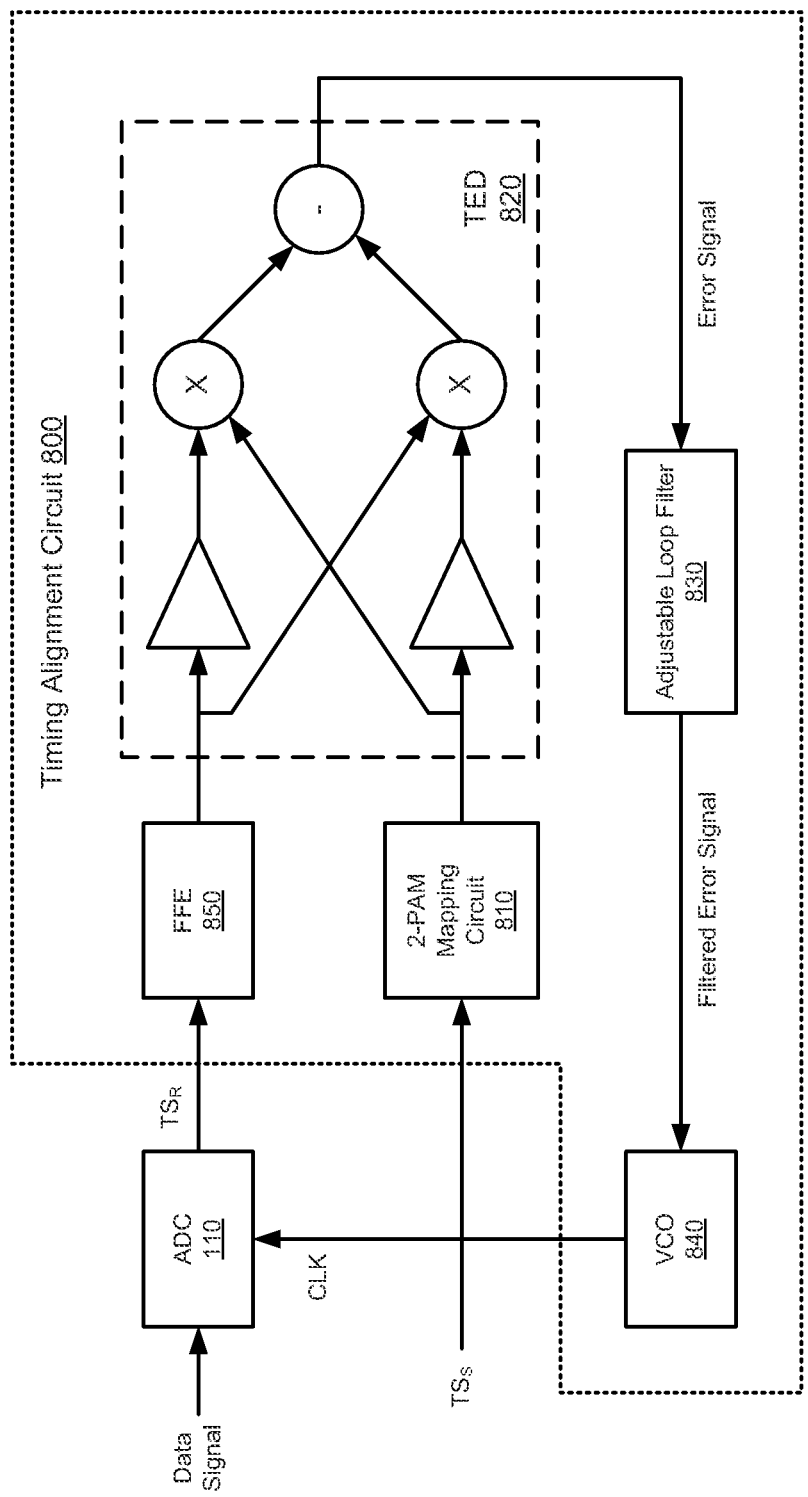
FIG. 8 shows a block diagram of a timing alignment circuit in accordance with some embodiments.

FIG. 8 shows a block diagram of a timing alignment circuit 800 that is one embodiment of the timing alignment circuit 140 of FIG. 1. The timing alignment circuit 800 includes a 2-PAM mapping circuit 810, a timing error detection (TED) circuit 820, an adjustable loop filter 830, and a VCO 840, and is shown in FIG. 8 as being coupled to ADC 110. As described above, the ADC 110 samples the received data signal to recover the training sequence $TS_R$. The VCO 840 may provide the receive clock signal (CLK) used by the ADC 110 to sample the received data signal. For some embodiments, the received training sequence $TS_R$ may be processed by a feed-forward equalizer (FFE) 850 to improve output jitter RMS performance. Specifically, the FFE 850 may partially mitigate intersymbol interference (e.g., by reducing ISI noise terms), thus improving jitter performance.

The 2-PAM mapping circuit 810 may convert each bit of the synchronized training sequence $TS_S$ to a 2-PAM voltage level. The TED circuit 820 includes inputs to receive both the synchronized training sequence $TS_S$ and the received training sequence $TS_R$, and outputs an error signal representing a timing error between the two training sequences $TS_S$ and $TS_R$. For some embodiments, the TED circuit 820 may correspond to a Mueller-Muller timing error detection circuit, wherein the timing error (X) may be calculated as:

$$X_N = TS_{RN} * TS_{S(N-1)} - TS_{R(N-1)} * TS_{SN}$$

where N represents the current bit of a corresponding training sequence ($TS_S$ or $TS_R$), and N−1 represents the previous bit of the training sequence (e.g., the bit associated with a previous clock cycle).

For some embodiments, the error signal may be filtered by adjustable loop filter 830 to produce a filtered error signal. For example, the adjustable loop filter 830 may suppress any excess noise in the error signal output by the TED circuit 820, for example, to produce a more useful and precise filtered error signal. For some embodiments, one or more loop parameters of the adjustable loop filter 830 may be adjusted (e.g., over a period of time) to further ensure good jitter performance.

The VCO 840 receives the filtered error signal from the adjustable loop filter 830 and adjusts the CLK signal in response thereto. Specifically, the filtered error signal causes the VCO 840 to align a sampling edge of the clock signal CLK with the peak (or center) of each symbol of the received data signal. For example, a voltage level associated with the filtered error signal may cause the VCO 840 to either increase or decrease the oscillation frequency of the CLK signal. More specifically, the VCO 840 may increase the oscillation frequency of the CLK signal when the voltage level of the filtered error signal is increased, and the VCO 840 may decrease the oscillation frequency of the CLK signal when the voltage level of the filtered error signal is decreased. Accordingly, the timing alignment circuit 800 may operate in a feedback loop until the CLK signal is precisely aligned with the symbol peaks of the received data signal.

It should be noted that if the synchronized training sequence $TS_S$ isn't at least coarsely aligned with the received training sequence $TS_R$, it may take a very long time for the timing alignment circuit 800 to lock the frequency and/or phase of the CLK signal with the received data signal. Thus, the timing recovery system of the present embodiments is especially advantageous when used in high-spd (e.g., 10GBASE-T) Ethernet systems.

Figure 9:
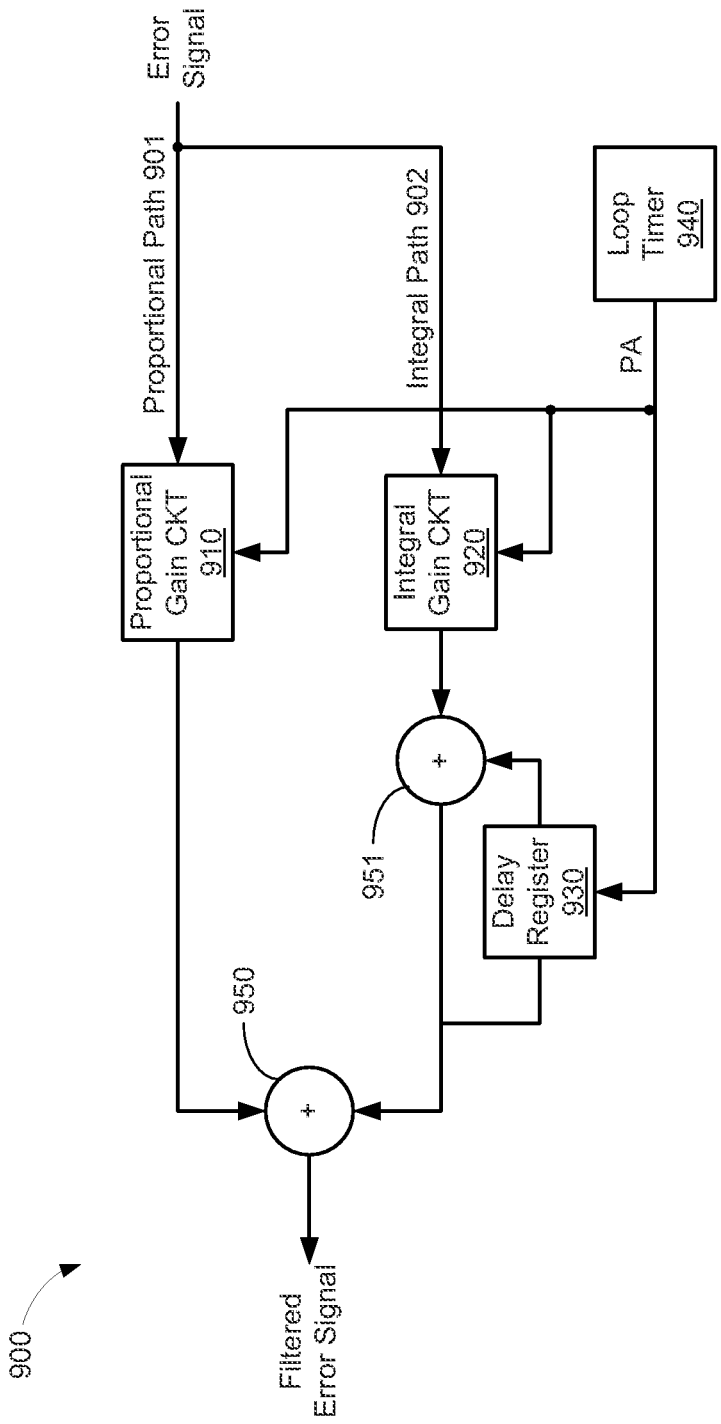
FIG. 9 shows a block diagram of an adjustable loop filter in accordance with some embodiments.

FIG. 9 shows a block diagram of an adjustable loop filter 900 that is one embodiment of the adjustable loop filter 830 of FIG. 8. The adjustable loop filter 900 includes a proportional gain component 910, an integral gain component 920, a delay register 930, a loop timer 940, and summing circuits 950-951. An error signal received by the adjustable loop filter 900 may be divided into two paths: a proportional path 901 and an integral path 902. The proportional path 901 includes the proportional gain component 910, which multiplies the error signal by a proportional loop parameter ($K_p$) to filter phase error. The integral path includes the integral gain component 920, which multiplies the error signal by an integral loop parameter ($K_i$) and then integrates the $K_i$-multiplied error signal with a delayed copy of the error signal provided by delay register 930. The proportional path 901 is combined with the integral path 902 via summing circuit 950 to generate a filtered error signal.

For some embodiments, the loop parameter $K_p$ associated with proportional gain component 910 and/or the loop parameter $K_i$ associated with the integral gain component 920 may be adjusted after a threshold period of time indicated by a loop timer 940 to improve jitter performance. Specifically, the loop timer 940 may output a parameter adjust (PA) signal after a threshold duration of time has expired. For some embodiments, the threshold duration may correspond to a fixed duration that allows the timing loop to catch up with an initial frequency offset. In response to the PA signal, the value stored in the delay register 930 may be held constant while the loop parameters $K_p$ and $K_i$ are adjusted (e.g., reduced from an initial value).

Figure 10:
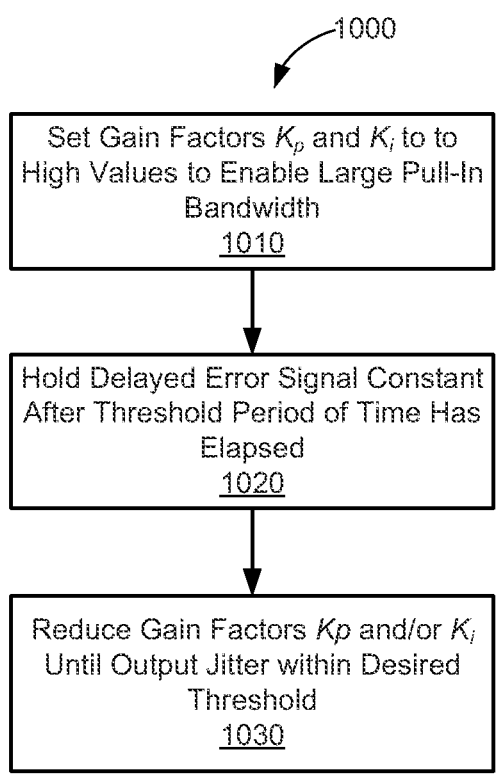
FIG. 10 is an illustrative flow chart depicting an exemplary loop parameter adjustment operation in accordance with some embodiments.

FIG. 10 is an illustrative flow chart depicting an exemplary loop parameter adjustment operation 1000 in accordance with some embodiments. Referring also to FIG. 9, in the operation 1000, the loop parameters $K_p$ and $K_i$ are initially set to relatively large values (1010). For example, the proportional gain component 910 and the integral gain component 920 may initially set their respective loop parameters to $K_p=2^{-14}$ and $K_i=2^{-30}$ so that the adjustable loop filter 900 exhibits a large pull-in bandwidth.

After a threshold period of time has elapsed, the delayed error signal provided along the integral path 902 of the loop filter 900 is held constant (1020). For example, after the threshold period has elapsed, the loop timer 940 may output the PA signal, which instructs the delay register 930 to hold its current state. For some embodiments, the threshold period may correspond to a minimum duration of time that allows the timing loop of the adjustable loop filter 900 to catch up with an initial frequency offset.

Then, while the delayed error signal is being held constant, the loop parameters $K_p$ and $K_i$ are reduced until the output jitter of the filtered error signal is within a desired threshold (1030). For example, upon detecting the PA signal, the proportional gain and integral gain components 910 and 920 may reduce their respective loop parameters to $K_p=2^{-18}$ and $K_i=2^{-38}$ so that the pull-in bandwidth (and thus the output jitter) of the adjustable loop filter 900 is within a narrower threshold.

Table 1 below shows an exemplary relationship between the loop parameters $K_p$ and $K_i$, the pull-in bandwidth, and the output jitter of an example embodiment of adjustable loop filter 900.

TABLE 1

| $K_p$ | $K_i$ | Pull-In Bandwidth | RMS of Output Jitter |
|---|---|---|---|
| $2^{-14}$ | $2^{-30}$ | ±100 ppm | 4.25 ps |
| $2^{-16}$ | $2^{-34}$ | ±25 ppm | 1.75 ps |
| $2^{-18}$ | $2^{-38}$ | ±6 ppm | 0.5 ps |

It should be noted that 10GBASE-T Ethernet systems require at least 100 ppm pull-in bandwidth, with a limit of 1 ps RMS out jitter. Typical loop filters (i.e., having fixed loop parameters $K_p$ and $K_i$) may not be able to satisfy both requirements, as shown in Table 1. However, the adjustable loop filter 900 disclosed in the present embodiments may be able to satisfy both requirements using the loop parameter adjustment operation 1000 described above.

It will be appreciated that the timing recovery operations disclosed in the present embodiments are especially advantageous when used in high-speed (e.g., 10GBASE-T) Ethernet systems. For example, the data synchronization circuit (e.g., FIGS. 3 and 6) produces a synchronized training sequence $TS_S$ that is coarsely aligned with a received training sequence $TS_R$. This enables the timing alignment circuit (e.g., FIG. 8) to quickly and precisely lock the frequency and/or phase of a receive clock signal with a corresponding data signal received from another device. In addition, such high-speed Ethernet systems typically have a very high echo cancellation gain requirement, which in turn requires very low timing recovery loop output jitter. Nonetheless, the adjustable loop filter disclosed in the present embodiments may allow for both a relatively high pull-in bandwidth as well as a low output jitter threshold.

Figure 11:
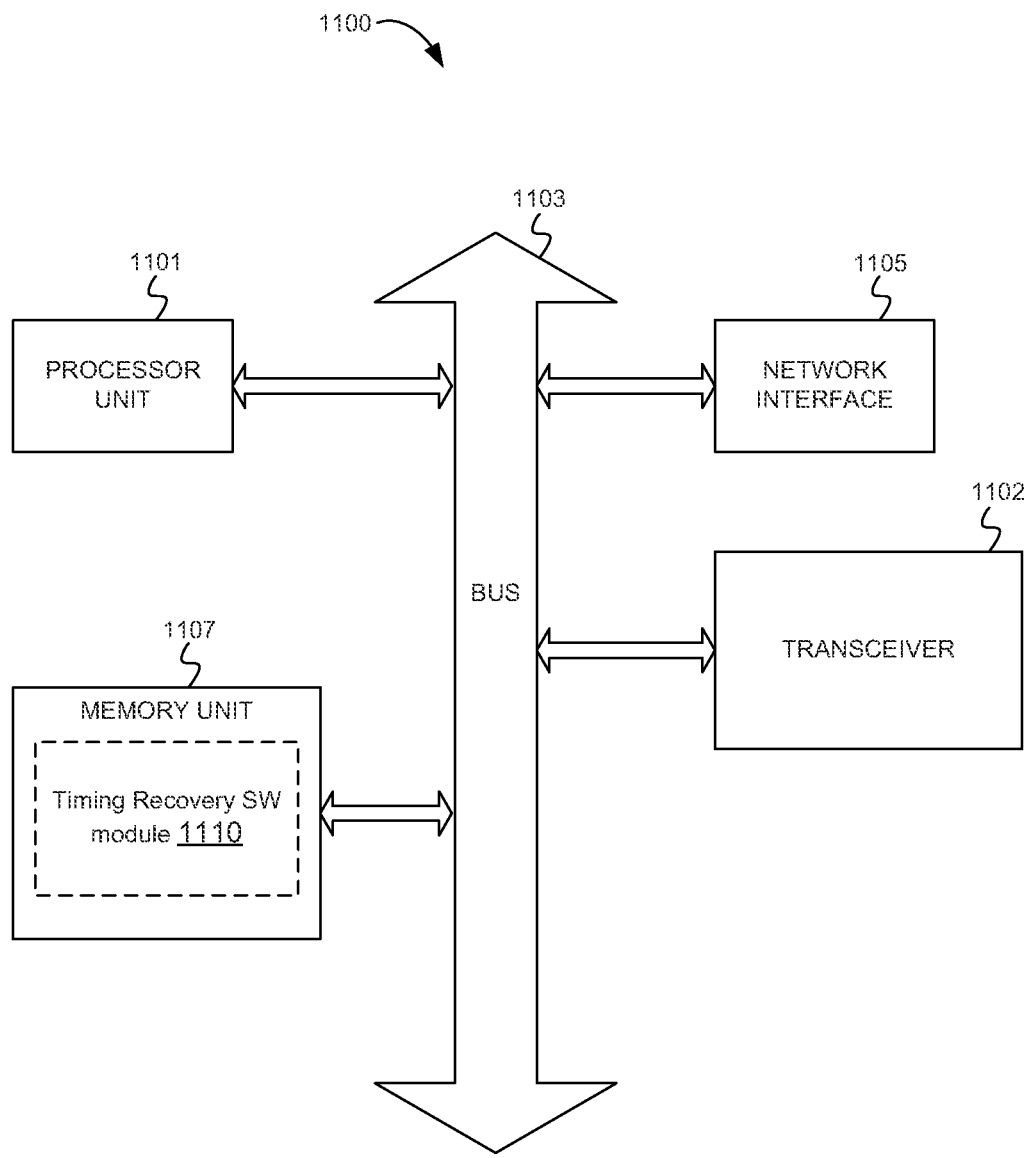
FIG. 11 is a block diagram of a communication device in accordance with some embodiments.

FIG. 11 is an example of a block diagram of a communication device 1100 that may include the present embodiments. In some embodiments, the device 1100 is a wireless device (e.g., a WLAN device). In some embodiments, the device 1100 is a wired device (e.g., an Ethernet device).

The device 1100 includes a processor unit 1101, a transceiver 1102, a network interface 1105, and a memory unit 1107 coupled by a bus 1103. The processor unit 1101 includes one or more processors and/or processor cores. For some embodiments, the network interface 1105 includes at least one wired network interface (e.g., an Ethernet interface, an EPON interface, an EPoC interface, etc.). For other embodiments, the device 1100 includes at least one wireless network interface (e.g., a WLAN interface, a Bluetooth® interface, a WiMAX interface, a ZigBee® interface, a Wireless USB interface, etc.).

The memory unit 1107 includes a non-transitory computer-readable storage medium (e.g., one or more nonvolatile memory elements, such as EPROM, EEPROM, Flash memory, a hard disk drive, and so on) that stores a timing recovery software module 1110. In some embodiments, the timing recovery software module 1110 includes one or more programs with instructions that, when executed by processor unit 1101, cause the communication device 1100 to perform the operations 200, 400, 710, and/or 1000 of FIGS. 2, 4, 7A-7B, and 10, respectively.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense. For example, the method steps depicted in the flow charts of FIGS. 2, 4, 7A-7B, and/or 10 may be performed in other suitable orders and/or multiple steps may be combined into a single step.

What is claimed is:

1. A method of timing recovery performed by a first device, the method comprising:
    negotiating a pseudorandom number sequence with a second device;
    sampling a data signal received from the second device to recover a first training sequence;
    generating a second training sequence based on the pseudorandom number sequence;
    synchronizing the second training sequence with the first training sequence by comparing the first training sequence with the second training sequence and iteratively adjusting the second training sequence based on the comparing, wherein comparing the first training sequence with the second training sequence comprises:
        determining a peak correlation between the first training sequence and the second training sequence by comparing each bit of the first training sequence with two or more bits of the second training sequence over a threshold number of data cycles, wherein the peak correlation is based on a number of matching bits within the first training sequence and the second training sequence and further based on a degree of variation between adjacent bits of the pseudorandom number sequence; and
    aligning a receive clock signal of the first device with the received data signal using the synchronized second training sequence.

2. The method of claim 1, wherein iteratively adjusting the second training sequence comprises:
    incrementing an address pointer that generates the second training sequence if no peak correlation is detected after the threshold number of data cycles.

3. The method of claim 1, wherein the second training sequence is synchronized with the first training sequence when the peak correlation is detected.

4. The method of claim 1, wherein the receive clock signal is to sample the data signal received from the second device.

5. A method of timing recovery performed by a first device, the method comprising:
    negotiating a pseudorandom number sequence with a second device;
    sampling a data signal received from the second device to recover a first training sequence;
    generating a second training sequence based on the pseudorandom number sequence;
    synchronizing the second training sequence with the first training sequence; and
    aligning a receive clock signal of the first device with the received data signal using the synchronized second training sequence, wherein aligning the receive clock signal comprises determining a timing error between the first training sequence and the synchronized second training sequence and adjusting the receive clock signal based on the timing error.

6. The method of claim 5, wherein the timing error comprises a Mueller-Muller timing error.

7. The method of claim 5, wherein determining the timing error comprises:
    generating an error signal corresponding to the timing error between the first training sequence and the synchronized second training sequence.

8. The method of claim 7, further comprising:
    filtering the error signal using a loop filter; and
    adjusting one or more parameters of the loop filter to limit jitter in the receive clock signal.

9. The method of claim 8, wherein adjusting one or more parameters of the loop filter comprises:
    decreasing a value of the one or more parameters of the loop filter after a threshold amount of time has elapsed.

10. The method of claim 1, wherein recovering the first training sequence further comprises:
    mitigating intersymbol interference in the received data signal using feed-forward equalization.

11. A non-transitory computer-readable storage medium configured to store program instructions that, when executed by a processor of a first device, cause the first device to:
    negotiate a pseudorandom number sequence with a second device;
    sample a data signal received from the second device to recover a first training sequence;
    generate a second training sequence based on the pseudorandom number sequence;
    synchronize the second training sequence with the first training sequence by comparing the first training sequence with the second training sequence; and iteratively adjusting the second training sequence based on the comparing, wherein comparing the first training sequence with the second training sequence comprises:
        determining a peak correlation between the first training sequence and the second training sequence by comparing each bit of the first training sequence with two or more bits of the second training sequence over a threshold number of data cycles, wherein the peak correlation is based on a number of matching bits within the first training sequence and the second training sequence and further based on a degree of variation between adjacent bits of the pseudorandom number sequence; and
    align a receive clock signal of the first device with the received data signal using the synchronized second training sequence.

12. The non-transitory computer-readable storage medium of claim 11, wherein execution of the program instructions to iteratively adjust the second training sequence cause the first device to:
    increment an address pointer used to generate the second training sequence if no peak correlation is detected after the threshold number of data cycles.

13. The non-transitory computer-readable storage medium of claim 11, wherein the second training sequence is synchronized with the first training sequence when the peak correlation is detected.

14. The non-transitory computer-readable storage medium of claim 11, wherein the receive clock signal is used to sample the data signal received from the second device.

15. A non-transitory computer-readable storage medium configured to store program instructions that, when executed by a processor of a first device, cause the first device to:
    negotiate a pseudorandom number sequence with a second device;
    sample a data signal received from the second device to recover a first training sequence;
    generate a second training sequence based on the pseudorandom number sequence;
    synchronize the second training sequence with the first training sequence; and
    align a receive clock signal of the first device with the received data signal using the synchronized second training sequence, wherein aligning the receive clock signal comprises determining a timing error between the first training sequence and the synchronized second training sequence, and adjusting the receive clock signal based on the timing error.

16. The non-transitory computer-readable storage medium of claim 15, wherein the timing error comprises a Mueller-Muller timing error.

17. The non-transitory computer-readable storage medium of claim 15, wherein execution of the program instructions to determine the timing error cause the first device to:
    generate an error signal corresponding to the timing error between the first training sequence and the synchronized second training sequence.

18. The non-transitory computer-readable storage medium of claim 17, further comprising program instructions that cause the first device to:
    filter the error signal; and
    adjust one or more parameters of a loop filter to limit jitter in the receive clock signal.

19. A device, comprising:
    a processor to negotiate a pseudorandom number sequence with another device;
    an analog-to-digital converter (ADC) to sample a data signal received from the other device to recover a first training sequence;
    a training sequence generator to generate a second training sequence based on the pseudorandom number sequence;
    a data synchronization circuit to synchronize the second training sequence with the first training sequence; and
    a timing alignment circuit to align a receive clock signal of the device with the received data signal using the synchronized second training sequence;
    wherein the data synchronization circuit comprises:
        a peak detection circuit to compare the first training sequence with the second training sequence, the peak detection circuit comprising a plurality of comparators to compare each bit of the first training sequence with two or more bits of the second training sequence to generate a plurality of match values and a peak detect logic to determine a peak correlation between the first training sequence and the second training sequence based on the plurality of match values; and
        a data adjustment circuit to iteratively adjust the second training sequence based on the comparison.

20. The device of claim 19, wherein the peak correlation is based upon a number of matching bits within the first training sequence and the second training sequence and upon a degree of variation between adjacent bits of the pseudorandom number sequence.

21. The device of claim 19, wherein the second training sequence is synchronized with the first training sequence when the peak correlation is detected.

22. The device of claim 19, wherein the data adjustment circuit comprises:
    a memory to sequentially output bits of the second training sequence to the peak detection circuit; and
    an address counter to increment an address pointer of the memory if no peak correlation is detected after a threshold number of data cycles.

23. The device of claim 19, wherein the timing alignment circuit comprises:
    an error detection circuit to determine a timing error between the first training sequence and the synchronized second training sequence, and to output an error signal corresponding to the timing error; and
    a voltage controlled oscillator to adjust the receive clock signal in response to the error signal.

24. The device of claim 23, wherein the error detection circuit comprises a Mueller-Muller timing error detection circuit.

25. The device of claim 23, wherein the timing alignment circuit further comprises:

a loop filter to filter the error signal output from the error detection circuit, wherein the loop filter includes one or more adjustable parameters for limiting jitter in the receive clock signal.

26. The device of claim 25, wherein the loop filter is a second-order loop filter having a proportional path and an integral path.

* * * * *